United States Patent
Della Corte et al.

(10) Patent No.: US 10,956,606 B2
(45) Date of Patent: Mar. 23, 2021

(54) MASKING OF SENSITIVE PERSONAL INFORMATION BASED ON ANOMALY DETECTION

(71) Applicant: INTERNATIONAL BUSINESS MACHINES CORPORATION, Armonk, NY (US)

(72) Inventors: Gianluca Della Corte, Rome (IT); Leonida Gianfagna, Ciampino (IT); Stefano Proietti, Rome (IT); Antonio Sgro, Fiumicino (IT)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 15/928,195

(22) Filed: Mar. 22, 2018

(65) Prior Publication Data

US 2019/0294814 A1 Sep. 26, 2019

(51) Int. Cl.
*G06F 21/62* (2013.01)
*G06F 21/31* (2013.01)
(Continued)

(52) U.S. Cl.
CPC ...... *G06F 21/6245* (2013.01); *G06F 11/3438* (2013.01); *G06F 21/316* (2013.01);
(Continued)

(58) Field of Classification Search
CPC ....... H04L 63/08; H04L 63/107; H04L 63/20; H04L 63/10; H04L 63/0492; H04L 63/0876; H04L 67/22; H04L 67/18; H04L 67/30; H04L 9/0872; H04L 9/0866; H04W 12/0605; H04W 12/08; H04W 12/00503; H04W 12/00504; H04W 12/02; H04W 12/00508; H04W 12/1206; H04W 4/021; H04W 4/029; H04W 4/024; H04W 4/025; H04W 64/00; H04W 48/04; G06F 2221/2111; G06F 2221/2139; G06F 21/31;
(Continued)

(56) References Cited

U.S. PATENT DOCUMENTS 8,302,152 B1 * 10/2012 Hewinson ............... G06F 16/29
726/1
8,949,155 B2 2/2015 Ramberg
(Continued)

FOREIGN PATENT DOCUMENTS

WO 2016044741 A1 3/2016

OTHER PUBLICATIONS

Rao, Ashwini, Florian Schaub, and Norman Sadeh. "What do they know about me? Contents and concerns of online behavioral profiles." arXiv preprint arXiv:1506.01675 (2015). (Year: 2015).*
(Continued)

*Primary Examiner* — Michael Simitoski
(74) *Attorney, Agent, or Firm* — Anthony M. Pallone

(57) ABSTRACT

A method to replace profile related data is suggested. A history database including recorded profile related data may be provided. Upon receiving actual profile related data, a processor may retrieve, from the history database, at least one recorded profile related data, matching to the actual profile related data. Then, a command may be received, from a user, to replace at least one part of the actual profile related data.

20 Claims, 6 Drawing Sheets

(51) Int. Cl.
  *G06F 11/34* (2006.01)
  *H04L 29/06* (2006.01)
  *H04W 12/06* (2021.01)
(52) U.S. Cl.
  CPC .......... *G06F 21/6254* (2013.01); *H04L 63/08* (2013.01); *H04W 12/0605* (2019.01)
(58) Field of Classification Search
  CPC .... G06F 21/316; G06F 21/6245; G06F 21/88; G06Q 20/3224; G06Q 30/0261
  See application file for complete search history.

(56) References Cited

U.S. PATENT DOCUMENTS

| | | |
|---|---|---|
| 9,245,149 B1 | 1/2016 | Chereshnev et al. |
| 9,325,715 B1 | 4/2016 | Chereshnev et al. |
| 10,542,021 B1* | 1/2020 | Mehr ................... H04L 63/1416 |
| 10,574,667 B2* | 2/2020 | Ingrassia, Jr. ......... H04W 12/08 |
| 10,637,853 B2* | 4/2020 | Lindemann ........... H04L 63/126 |
| 2002/0083025 A1* | 6/2002 | Robarts ................... G06F 16/40 |
| | | 706/12 |
| 2003/0093329 A1* | 5/2003 | Gutta ................. H04N 21/4668 |
| | | 705/26.1 |
| 2009/0006286 A1* | 1/2009 | Angell ............... G06Q 30/0255 |
| | | 706/12 |
| 2014/0143886 A1 | 5/2014 | Everson et al. |
| 2014/0244399 A1 | 8/2014 | Orduna et al. |
| 2014/0297635 A1 | 10/2014 | Orduna et al. |
| 2016/0232377 A1 | 8/2016 | Snelling |
| 2017/0303110 A1* | 10/2017 | Truong ................. H04L 67/306 |
| 2019/0180398 A1* | 6/2019 | Chen ................... G06K 9/00275 |
| 2020/0178077 A1* | 6/2020 | Dutt ....................... H04W 12/06 |
| 2020/0184480 A1* | 6/2020 | Wang ..................... G06Q 50/01 |

OTHER PUBLICATIONS

Bettini et al., "Protecting Privacy Against Location-Based Personal Identification", SDM 2005, LNCS 3674, pp. 185-190.
Toch et al., "Personalization and privacy: a survey of privacy risks and remedies in personalization-based systems", User Model User-Adap Inter (2012), vol. 22, pp. 203-220.
Mell et al., "The NIST Definition of Cloud Computing", Recommendations of the National Institute of Standards and Technology, NIST Special Publication 800-145, Sep. 2011, 7 pages.

* cited by examiner

MASKING OF SENSITIVE PERSONAL INFORMATION BASED ON ANOMALY DETECTION

BACKGROUND

The present invention relates to the field of behavior profiles, and in particular to mask sensitive personal information from such profile, based on anomaly detection.

In the current social world, where there is a lot of personal information collected by many systems, it may happen that sensitive personal information is shared. Such information may be used by many cognitive systems to propose dynamic content based on the usual user behavior. For example, based on the normal travel done by a user, some tools may propose shopping during the travel, or other activities. The end result is that user behaviors are tracked and then shared with the risk of personal information used by other people.

SUMMARY

Various embodiments provide for a computer implemented method to replace profile related data, a computer program product and a mobile computer as described in the independent claims. Advantageous embodiments are described in the dependent claims. Embodiments of the present invention can be freely combined with each other if they are not mutually exclusive.

In one aspect, the invention relates to a computer implemented method to replace profile related data, including: providing a history database, wherein the history database comprises recorded profile related data; receiving actual profile related data; retrieving, by a processor, from the history database, at least one recorded profile related data, wherein the at least one recorded profile related data matches to the actual profile related data; prompting, by a processor, a user with alternative profile data, wherein the alternative profile related data comprises the least one recorded profile related data, and wherein the least one recorded profile related data is modified according to available environmental conditions; receiving, from the user, a command to replace at least one part of the actual profile related data with the alternative profile related data; and replacing the at least one part of the actual profile related data with the alternative profile related data.

In another aspect, the invention relates to a computer program product to replace profile related data, the computer program product including: a computer readable storage medium having computer usable code embodied therewith, wherein the computer readable storage medium is not a transitory signal per se, the computer usable program code including: computer usable code configured to provide a history database, wherein the history database comprises recorded profile related data; computer usable code configured to receive actual profile related data; computer usable code configured to retrieve, by a processor, from the history database, at least one recorded profile related data, wherein the at least one recorded profile related data matches to the actual profile related data; computer usable code configured to prompt, by a processor, a user with alternative profile data, wherein the alternative profile related data comprises the least one recorded profile related data, and wherein the least one recorded profile related data is modified according to available environmental conditions; computer usable code configured to receive, from the user, a command to replace at least one part of the actual profile related data with the alternative profile related data; and computer usable code configured to replace the at least one part of the actual profile related data with the alternative profile related data.

In another aspect, the invention relates to a mobile computer carrying a computer program product to replace profile related data, the computer program product including: a computer readable storage medium having computer usable code embodied therewith, wherein the computer readable storage medium is not a transitory signal per se, the computer usable program code including: computer usable code configured to provide a history database, wherein the history database comprises recorded profile related data; computer usable code configured to receive actual profile related data; computer usable code configured to retrieve, by a processor, from the history database, at least one recorded profile related data, wherein the at least one recorded profile related data matches to the actual profile related data; computer usable code configured to prompt, by a processor, a user with alternative profile data, wherein the alternative profile related data comprises the least one recorded profile related data, and wherein the least one recorded profile related data is modified according to available environmental conditions; computer usable code configured to receive, from the user, a command to replace at least one part of the actual profile related data with the alternative profile related data; and computer usable code configured to replace the at least one part of the actual profile related data with the alternative profile related data.

BRIEF DESCRIPTION OF THE DRAWINGS

A detailed description of the invention is given in the following drawings in which.

DETAILED DESCRIPTION

Figure 1:
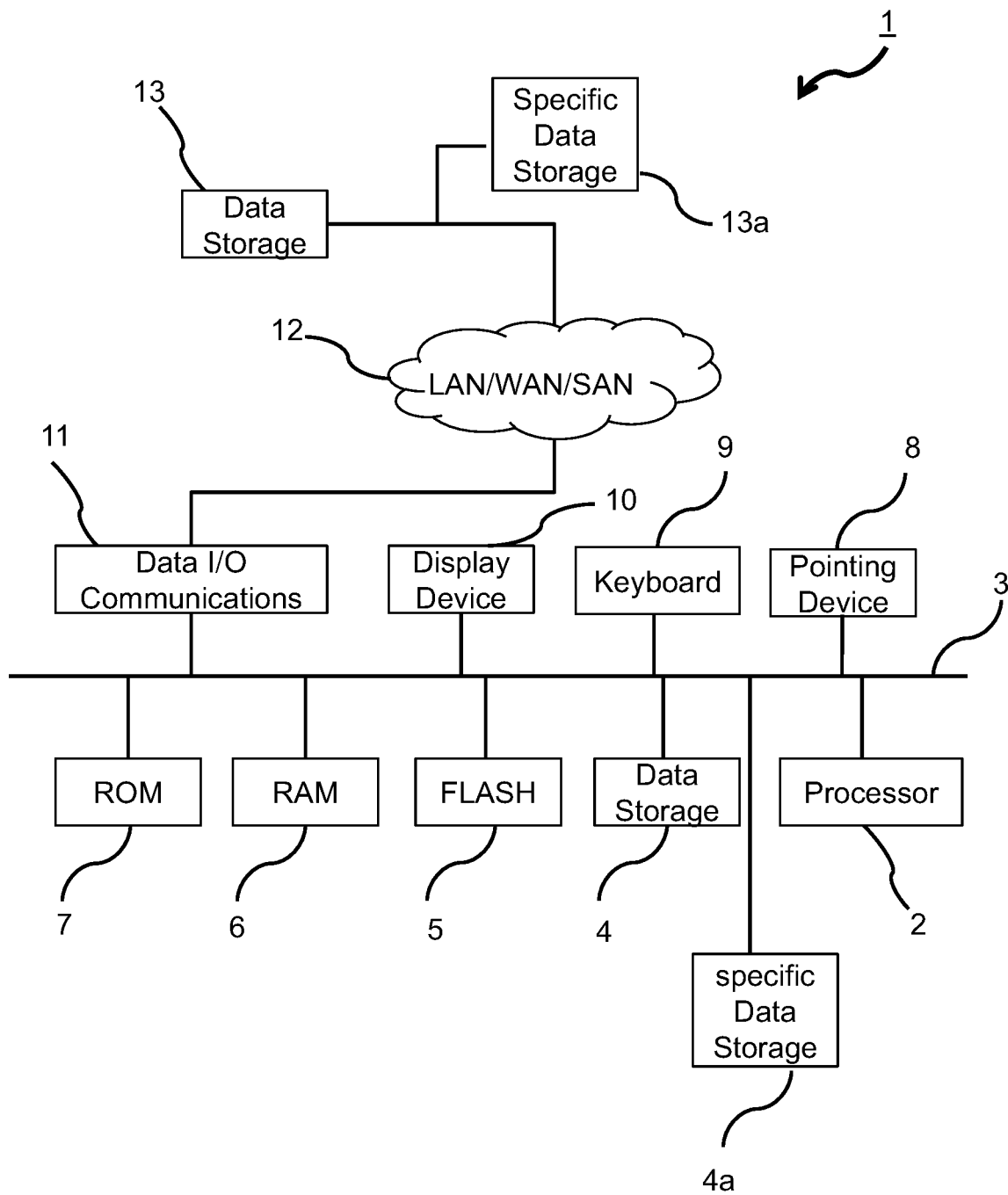
FIG. 1 depicts a block diagram of a computing system, in accordance with an embodiment of the invention.

The descriptions of the various embodiments of the present invention have been presented for purpose of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present method as described below may be able to replace profile related data. This may have the benefit that a user retains the power of decision about data related to the user's profile.

"Profile related data" as used herein refers to a user behavior profile. A user behavior profile may include one or more sets of values of at least one sensor. A sensor may detect physical entities and provide, based thereupon, physical data. Such physical data may include, at least, but not limited to: time, location, brightness of ambient light, and much more as will be referred to below. Furthermore, the profile related data may include one or more of: physical data, evaluated physical data, compressed physical data, and time series of physical data. For example, evaluated physical data may include a photograph or fingerprint of a person that is biometrically analyzed to provide a comparable data set. Such data, e.g. a digital picture, may also be compressed. A time series of physical data may include sets or subsets of data, as for example, a course of time, location and air pressure.

In one example, a history database including recorded profile related data may be provided. This may have the advantage that a user behavior profile is stored and the content of it may be retrieved at any time. This may have a further advantage of enabling a user to select a recorded profile and edit it if the user wants to.

In one example actual profile related data is received. "Actual" as used herein may be understood as "just now in time" but also "another set of new profile related data, not already processed in history database". "Actual" thus is used to differ from the content of the established history database.

In a further example there is retrieved, by a processor, from the history database, at least one recorded profile related data, matching to the actual profile related data. It is to be understood that the "matching" does not necessarily require an exact match of the complete data set. Merely, "matching" may be understood to be "matching at least partially". This is the case for example, when comparison of all recorded profile related data sets from the history database with the actual profile related data set yields a profile related data set from the history database that has more data parts in common with the actual profile related data set than all other recorded profile related data sets. E.g., when the actual profile related data sets and the recorded profile related data set refer to the same time of day but to a different location, these both data sets may be regarded as matching profile related data sets.

As used herein, "profile related data set" is to be seen as having the same meaning as "profile related data", however emphasizing the aspect that profile related data usually is included of more than one representation of physical data. For example, a profile related data may be a profile related data set that may include one or more of a time value, a value of brightness of ambient light, and a location.

In an example, the method may include receiving, from a user, a command to replace at least one part of the actual profile related data. This may have the advantage that the user decides, whether his actual behavior shall be stored in the history database, with the risk of being shared, or whether his actual behavior shall be discarded and replaced by another behavior, that may already have been stored in the history database. Alternatively, or additionally, the user may be prompted with alternative suggestions that refer to actions that are possible at his actual time and location.

Thus, an advantage to the user may be provided by allowing the user to decide, which of his actions to be shared or to be discarded, or at least modified, in the history database. It is to be understood, that to discard a profile related data, or to remove it, or to replace it may be used synonymously. Further, when referring to sharing, discarding, modifying, or replacing profile related data, it is to be understood that also may be included, to share, discard, modify or replace only a part of a profile related data set.

In an example, a method to replace profile related data, at least partially, is suggested. A history database including recorded profile related data may be provided. Upon receiving actual profile related data, a processor may retrieve, from the history database, at least one recorded profile related data, matching to the actual profile related data. Then, a command may be received, from a user, to replace at least one part of the actual profile related data.

Figure 2:
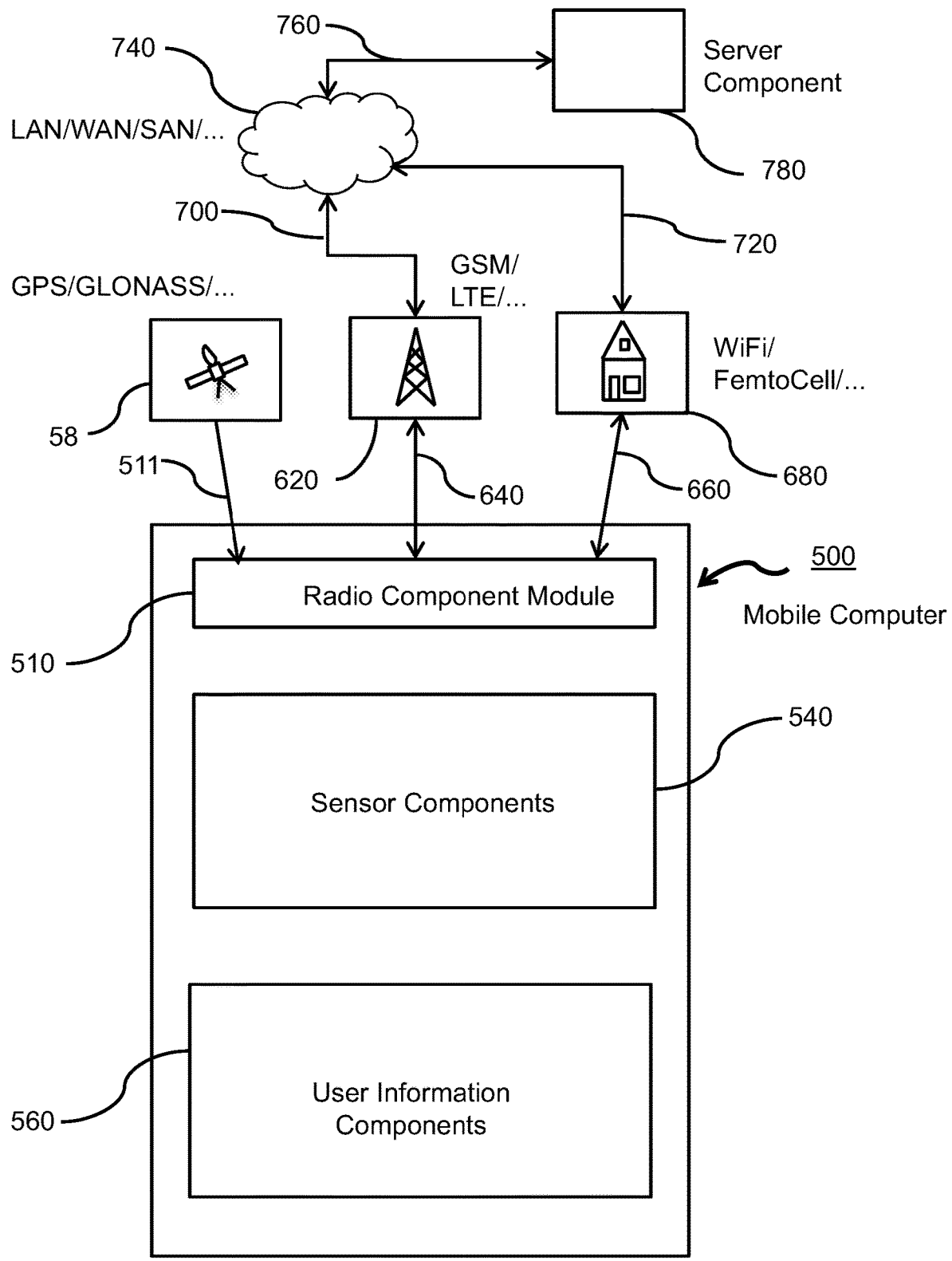
FIG. 2 depicts a block diagram of a mobile computing system, in accordance with an embodiment of the invention.

According to one embodiment, the recorded profile related data represents physical data received from at least one first sensor and the actual profile related data represents physical data received from at least one second sensor. In an example, both, i.e. the recorded and the actual, profile related data represent time and location. It is also considered that an activity of a radio component module 510 of a mobile computer 500 as illustrated in FIG. 2 is measured. For example, via the radio component module 510, a mobile payment, e.g. at a coffee shop may be performed. Thus, an example recorded profile related data may include (08:00 o'clock in the morning, address is a coffee shop, mobile payment for a cup of coffee is performed). When, e.g., in the actual profile related data, the mobile payment is missing, but time and location physical data matching to the example recorded profile related data is present, the user might be informed, e.g., "Please remember to get your cup of coffee this morning.". It is considered that the first sensor and the second sensor may be one and the same sensor. This may have the advantage that data sets are directly comparable.

According to another embodiment, the method may include: comparing, by the processor, whether the retrieved recorded profile related data differs from the actual profile related data; and in the case that the comparing yields a difference, prompting, by the processor, the difference to a user. For example, when the user usually, on Tuesday morning, goes to the office, which may be represented in a recorded profile related data set, and, on an actual Tuesday morning, he goes, e.g., playing golf, then the actual profile related data matches in time, but not in location to the recorded profile related data. This difference will be recognized as an unusual behavior. The user may be prompted, by the processor, to decide what to do with the actual data: Whether it shall be added to the history database, knowing that such information might get shared, or discarding the actual data, or mask the actual data by other data.

In one embodiment, the replacing step may include suggesting, to the user, to replace the at least one part of the actual profile related data with either the retrieved recorded profile related data or another retrieved recorded profile related data. In the above example, the user may be suggested to store the actual profile related data, however with the location "golf place" replaced by "office".

In one embodiment, the profile related data may include an independent part and a dependent part. For example, in a simple case, the independent part might be the time of day, day of week, and the dependent part might be the location. Thus, when a user has a daily routine from Monday to Friday to go to the office at 08:00 o'clock a.m., when there is a deviation in the dependent part, as for example, the user also goes on Saturday at the same aforementioned time to the office, such behavior may be recognized as different. In another example, the independent part might be brightness along with activity information provided by an accelerometer sensor to detect an activity as, for example, jogging, and, in the dependent part, a time series of locations that represent running around a house block. In such a way, when the user runs, as usual when it is bright outside, but selects another running way, such deviation, e.g., running around a different house block, or, anywhere else, may be recognized. Based on all data stored in the history database, it is possible by means of statistical methods, such as ranking, correlation, as is known in the art, to automatically derive and define dependent parts and independent parts and dynamically interchange these parts.

In one embodiment, the profile related data includes an independent part and a dependent part, and wherein, in the step of retrieving, the recorded profile related data may be found to be matching to the actual profile related data, when the independent part of the recorded profile related data is identical to or matches to the independent part of the actual profile related data. This may have the advantage that a recorded profile related data may be found 'matching' without matching 100% to the actual profile related data. For example, it might suffice that the recorded profile related data and the actual profile related data are similar only in time. Thus, with regard to the actual profile related data, a matching recorded profile related data may be found.

The profile related data may include an independent part and a dependent part, and, in the step of comparing, the dependent part of the recorded profile related data may be compared to the dependent part of the actual profile related data. In the above example, thus, the step of comparing, might, in respect of the time of the independent parts being similar, mean to compare the locations of the recorded profile related data with those of the actual profile related data.

In an embodiment, providing the history database may include evaluating the profile related data to establish a baseline. This may have the advantage, that a predictable behavior pattern, i.e., sets of predictable profile related data, is recorded and/or evaluated.

In an embodiment, receiving the actual profile related data may include receiving physical data that is at least one or more of the following, but not limited to: time, location, temperature, relative humidity, radio frequency interactions, e.g. mobile payment, ambient light brightness, orientation, velocity, acceleration, magnetic field, pressure, proximity, operating a button, and data of a mobile camera. This may have the advantage to seize any physical information about the user's actual environment to be put into the history database or to be prompted to him for a decision, as to how to proceed with the actual details of actual profile related data.

The said method may be executed by at least one processor in batch mode or in online mode or in a combination of the batch mode and the online mode. For example, the method may be executed completely within a mobile computer 500, at the same time the actual profile related data is being collected. Alternatively, the mobile computer 500 may store the actual profile related data and perform any statistical calculations during the night, in batch mode, and prompt the user next morning about suggestions. Such calculations may be performed on the mobile computer 500 alone, or, in cooperation with a server component 780 that is communicatively, wirelessly connected to the mobile computer 500. Alternatively, the server component 780 may be left alone with the calculations. Parts of the calculations may be performed online, leaving lengthy statistical operations to be executed, e.g. at nighttime, in batch mode.

In an embodiment, prompting the difference to the user may include offering replacement profile related data. Replacement profile related data may, for example, be either from the history database or from other shared information sources, alternatives that might be meaningful at, for example, the given time, or, the independent part of the profile related data. Such meaningful alternatives might be presented to the user, so that the user may decide, which alternative shall be taken to replace the actual profile related data.

In an embodiment, the actual profile related data may be determined to be an anomaly when a comparison yields a clear difference between the retrieved recorded profile related data and the actual profile related data. Usually, there may always be minor variations in profile related data. For example, there may be days when the user leaves home at 08:00 o'clock for the office, but it may also often occur that he leaves at 08:15. It may occur that he goes on a different side of the street or takes an alternative route on a random basis with always the same ending point: the office. Such deviations may be regarded as minor differences, whereas, leaving the city at 08:00 o'clock to go golfing may be regarded as clear difference, not in time, however in location.

In an embodiment, the method may include: deleting the actual profile related data, when the user selects the replacement profile related data to replace, at least partially, the actual profile related data. In the above example, the user might select, when being on the golf course, to replace the actual profile related data with the usual profile related data of going to the office.

In an embodiment, the method may include computing, by the processor, a replacement score, based on: environmental information retrieved from at least one sensor; and/or whether a replacement has already been performed, and, if yes, how many times (i.e. profile data replacement history); and/or a time, when the actual profile related data has been followed. A replacement score may be calculated when usual events are detected when obtaining the actual profile related data: for example, when the user leaves home on Tuesday at 08:00 o'clock, goes to the golf course, and takes pictures of his family (the pictures of the family possibly being biometrically compared to entries in the history database), then, the replacement score may be relatively low. If this happens regularly, the replacement score might get smaller—when it vanishes to zero, it is considered that the user is not prompted any longer for replacement. If, however, the user, at the same time, is at an airport, or does not take any pictures, the replacement score might be relatively high.

The replacement score computation is a function F(howmanytimeisAmaskedPattern, Environmental Conditions) (t) of a set of information retrieved from multiple systems:
1. if it is a location or pattern already masked in the past, the number of times it has been masked in the past over the time
2. the time when the new pattern has been followed
3. the environmental conditions (captured, for example, using the mobile camera); if the user is with family members it will provide a low replacement score. Some environmental conditions can be cognitive information extracted from social network alerts, for instance, that a highway is closed. According to the value of the replacement score, masking or not masking may be decided; one location, for instance, could be decided to be masked at one time, and could not at another time.

In an embodiment, a computer program product to replace profile related data is suggested, the computer program product including one or more of the following, already described in regard to the above method: a computer readable storage medium having computer usable code embodied therewith, wherein the computer readable storage medium is not a transitory signal per se, the computer usable program code including: computer usable code configured for providing a history database including recorded profile related data; computer usable code configured for receiving actual profile related data computer usable code configured for retrieving, by a processor, from the history database, at least one recorded profile related data, matching at least partially to the actual profile related data; computer usable code configured for receiving, by the processor, from a user, a command to replace at least one part of the actual profile related data. The computer readable storage medium may be included by a mobile computer, as for, e.g., a smartphone.

The computer usable code may be configured to perform any of the steps as described above in regard to the method presented herein.

In a further aspect, a mobile computer is considered, the mobile computer carrying a computer program product to replace profile related data, the computer program product including: a computer readable storage medium having computer usable code embodied therewith, wherein the computer readable storage medium is not a transitory signal per se, the computer usable program code including: computer usable code configured for providing a history database including recorded profile related data; computer usable code configured for receiving actual profile related data; computer usable code configured for retrieving, by a processor, from the history database, at least one recorded profile related data, matching at least partially to the actual profile related data; computer usable code configured for receiving, by the processor, from a user, a command to replace at least one part of the actual profile related data.

The computer usable code may be configured to perform any of the steps as described above in regard of the method presented herein.

In one embodiment a selective cognitive system is suggested, that may be provided to detect anomalies. The selective cognitive system may be arranged to provide, in the case an anomaly is detected, a signal, so that a user may be alerted, if a specific set of sensitive information should be used or not. If the user gives the command not to use the information, the system may propose to use another content or a different activity.

In one example, the user might usually every morning go to work and every evening return to his home. As a result, the cognitive system may start, for example, proposing activities or shopping based on this behavior. This behavior and/or the proposal of the cognitive system might be shared with other people.

At one point, it may happen that the user starts a new behavior, for example, he frequently leaves home but goes to a place different from home and different from work. The cognitive system may recognize this new behavior and, based thereon, it may start proposing activities based on the new behavior. As the cognitive system may be arranged for sharing all information, it may be possible that other people see the new behavior, even when the user would wish that they could not see said new behavior.

To solve this undesired sharing of information by the user, the cognitive system may identify the new behavior—in other words, the cognitive system may detect an anomaly. Then, the cognitive system may notify the user and prompt him for a command as to consider this anomaly to be a normal behavior to be used for suggestions, or to drop this anomaly and corresponding information, and leave it unconsidered.

The arrangement for providing this functionality may include one or more of: a historical data database, or a history database, that may be arranged to, by the help of a processor, maintain a history of normal activities performed by a specific user; a baseline generator that may be arranged to, by the help of a processor, create a baseline starting point employed for the user activities; an anomaly detector that may be arranged to, by the help of a processor, identify if there is an anomaly in the actual behavior of the user; a cognitive system component, that may be arranged to, by the help of a processor, take care of information pertinent to a specific behavior, to then propose a possible mask of the activity in order to replace it with a more common pattern, that may reflect specific environment activities.

The cognitive system, may be a software component, and may take as input the baseline and the received anomalies. It may identify a common pattern that may be used to mask or replace sensitive information. The cognitive system may, further, take as input, at least one, or, for example, all possible environment activities, in order to generate the pattern to be used for replacement of the real pattern.

One example of the operation of the aforesaid arrangement might be the following: A user may have his daily path between home and work. This may be considered as a normal pattern or behavioral pattern performed by the user. Thus, the anomaly detector may store such behavioral pattern in the history database.

In some point of his life, the user might start making deviations compared to his normal behavioral pattern. For example, he might go playing golf every Tuesday in the morning. The anomaly detector may recognize the new behavioral pattern. Then, the anomaly detector may ask the user, or prompt the user, if the new pattern is to be regarded as a "normal" pattern that is to be stored in the history database, or, if the new pattern is a sensitive information. If it is a sensitive information, the cognitive system may extract at least one common pattern from the baseline generator and may cross the new "false" pattern or new masking pattern with information relating to the present environment. To "cross" as used herein may mean to combine different sets of data in a way the user agrees with. Such information relating to the present environment may include an event, e.g., like the office was closed that specific day or similar. The real pattern, or new behavior pattern, may then be replaced with the masking pattern, in order to mask the specific information.

In more mathematical language:

$$\text{Real pattern } RP=F(t,x(y)), \text{ wherein } t \text{ is time and } x(y) \text{ is the pattern.} \quad (1)$$

Let FP be the false pattern or masking pattern.
Let Environment(fp) be the events affecting the FP.

$$\text{Then } MP=\text{masked pattern}=F(RP,\text{Environment}(fp)). \quad (2)$$

In other words: The masked pattern MP may be the result of the real pattern RP with the new false pattern FP modified with the environment cognitive information. The replacement pattern is adapted according to the environmental conditions. The replacement pattern becomes thus a normal pattern. For example, assuming that the user would like to change one event of the RP, such as, "go to restaurant XXXX for lunch at 1.00 PM", with a different one (because the user wants to mask the restaurant name in which he had the lunch) so that it becomes "go to restaurant YYYY for lunch at 1.00 PM" (this is from pattern FP). The cognitive engine checks the new restaurant YYYY in terms of the environmental conditions, such as traffic that is between the previous event location and the YYYY restaurant location. In case the resulting trip time to reach YYYY restaurant is too much (more than 20%) compared to the normal time required to reach restaurant XXXX (because of the specific traffic condition of that specific time in that day), it alerts the user and proposes a further change to make the new pattern realistic (MP) and to fit the overall timeline. The MP is thus generated through the modification of the FP with taking in consideration the environment cognitive information derived by the implementation of various logical rule-based validity checks of the environment variables.

In short, a cognitive method is suggested to identify which information or part of information should be masked and/or replaced by a regular pattern or regular profile related data.

The present invention may be a system, a method, and/or a computer program product and/or a mobile computer. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a mobile phone, e.g., a smart phone, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, mobile computer, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A block diagram illustrating an example computer processing system adapted to implement the methods of the present invention is shown in FIG. 1. The computer system, generally referenced 1, includes a processor 2 which may include a digital signal processor (DSP), central processing unit (CPU), microcontroller, microprocessor, microcomputer, ASIC or FPGA care. The system may also include a data storage 4, static read only memory 7 and dynamic main memory 6 and may also include a FLASH memory 5. The computer system may further include a specific data storage 4a. The specific data storage may be a part of data storage 4, FLASH 5 or RAM 6. The specific data storage 4a may be provided as a temporary storage for carrying profile related data that is provided to be displayed in some way to a user. For example, a dependent part of a recorded and retrieved profile related data said may be, thus, prepared to be displayed to the user. For example, when, according the method as described herein, a part of profile related data is to be prompted to the user to be replaced, such part might be copied into the data storage 4a. The processor 2 might then organize for alerting the user and display the contents of data storage 4a. The processor 2 is via a bus 3 in communication with any of said memory devices as well as with peripheral devices such as a display device 10, a keyboard 9, a pointing device 8, such as, e.g., a mouse or a tablet.

The computer system is connected to one or more external networks such as a LAN or WAN or SAN 12 via communications lines connected to the system via one or more data I/O communication interfaces 11, e.g. a network interface 11. The network adapters 11 coupled to the system enable the data processing system to become coupled to other data processing systems or remote printers or storage devices through intervening public or private networks. Modem, cable modem and Ethernet cards are just a few of the currently available types of network adapters. The system includes also a magnetic or semiconductor based data storage or storage device 13 for storing application programs and data. A specific data storage (13a) might serve the same purpose as data storage 4a as described above. The system includes a computer readable storage medium that may include any suitable memory means, including but not limited to, magnetic storage, optical storage, semiconductor volatile or non-volatile memory or any other memory storage device.

FIG. 2 depicts a block diagram of a mobile computing system 50, that may be one example of computer system 1 described above. The mobile computing system or mobile computer may include a radio component module 510. The radio component module 510 may consist of one or more of the following components, not shown for the reason of clarity, e.g., an antenna, a radio frequency transmitter, amongst other radio frequency subcomponents known in the art.

The mobile computer 500 may further include, though not shown herein, a battery, housing, buttons, as known in the art of smart phones. Further the mobile computer 500 may be equipped as already described with regard to computer system 1. In this regard it is completely referred to the above description concerning computer system 1.

The mobile computer 500 may further include, though not shown herein, a multiplicity of sensor components 540, as for, e.g., in a non-limiting enumeration: a clock arranged for detecting an actual time, a GPS or GLONASS sensor arranged for determining a location of the mobile computer via an interface 511, based on signals received from a satellite 58, a temperature sensor arranged for detecting an ambient temperature, a sensor arranged for detecting a relative humidity, software component arranged to cooperate with the radio component to detect events, based on radio frequency interactions, e.g. mobile payment, or to improve the location information gathered from the satellite 58 signal, a sensor arranged for detecting an ambient light brightness, a sensor arranged for detecting an orientation of the mobile computer 500, a sensor arranged for detecting a velocity and/or acceleration of the mobile computer 500, a sensor arranged for detecting a magnetic field at the location of the mobile computer 500, a sensor arranged for detecting an air pressure and/or height at the location where the mobile component is actually situated, a sensor arranged for determining a proximity, a button, a mobile camera.

It is noted that such a sensor component 540 may contain parts of software communicating with other sensor components or storing information, the parts of software being combined with specific single hardware parts such as storage.

The mobile computer 500 may further include user information components 560, not shown in detail here for the purpose of clarity. The user information components may include a display, arranged for visually display information to the user, e.g., to display actual profile related data or a part thereof that is prone to be masked and/or profile related data or part thereof that might be used to mask the actual profile related data or parts thereof. The user information components 560 may include a loudspeaker, e.g., for informing a user about the occurrence of a problem concerning an actual profile related data set, the problem possibly concerning sensitive information linked to, e.g., the actual location of the user. An alternative for informing the user might be a device arranged for providing a vibrating alert to the user. Thus, the user might be informed about a problem linked to the actual profile related data in a discreet manner.

The radio component module 510 of the mobile computer 500 may be arranged to receive, via an air interface 511, signals from one or more satellites 58, as for example GPS or GLONASS, or similar. The radio component module 510 may further be arranged to transmit and receive data via an air interface 640 that might be in communication with a mobile telecommunications system 620, such as GSM, LTE or a 5th generation GSM. The radio component module 510 may further be arranged to transmit and receive data via an air interface 660 that might be provided by a local WiFi 680 or FemtoCell 680, or similar, as a skilled person will be aware of.

The mobile computer 500 may further include components, e.g. software components, that combine signals received from two or more of the air interfaces 60, 64, and/or 66, in order to improve a location information, so that a more precise determination of the user's location may be made possible.

The corresponding component 62, e.g., a BTS or eNodeB, as known in the field of telecommunications, may be in close communication with a switch (not shown) that may be communicatively coupled, 700, to a network 740, that may be a LAN, a WAN, a SAN, or the internet. The corresponding component 680, e.g., a WiFi or femtoCell router, or similar, may be in close communication with another switch (not shown) that may be communicatively coupled, via an interface/line 720, to a network 740, that may be a LAN, a WAN, a SAN, or the internet.

A server component 780, that may be another embodiment of computer system 1, may be communicatively coupled, via an interface/line 760, to beforementioned network 74.

Thus, statistic calculations for evaluating recorded profile related, statistic calculations for evaluating actual profile related data may be, in one embodiment, performed completely in the mobile computer 500, in batch mode or in online mode. Alternatively, and/or additionally, the said statistics may be calculated on server component 780 that is in communication with the mobile computer 500 via one or more of the above air interfaces 64 and/or 66.

Employing server component 780 may have an advantage in that information gathered by server component 780 may be received on mobile computer 500, in a shared manner, and employed for suggesting, to the user, one or more replacement profile related data parts for replacing parts of the actual profile related data. Thus, it is not necessary to store all information on the mobile computer 500, that usually may have restricted storage and computing capacity, but the data may be provided on server component 780 that in combination with an internet 740 may be regarded as possibly unlimited.

Figure 3:
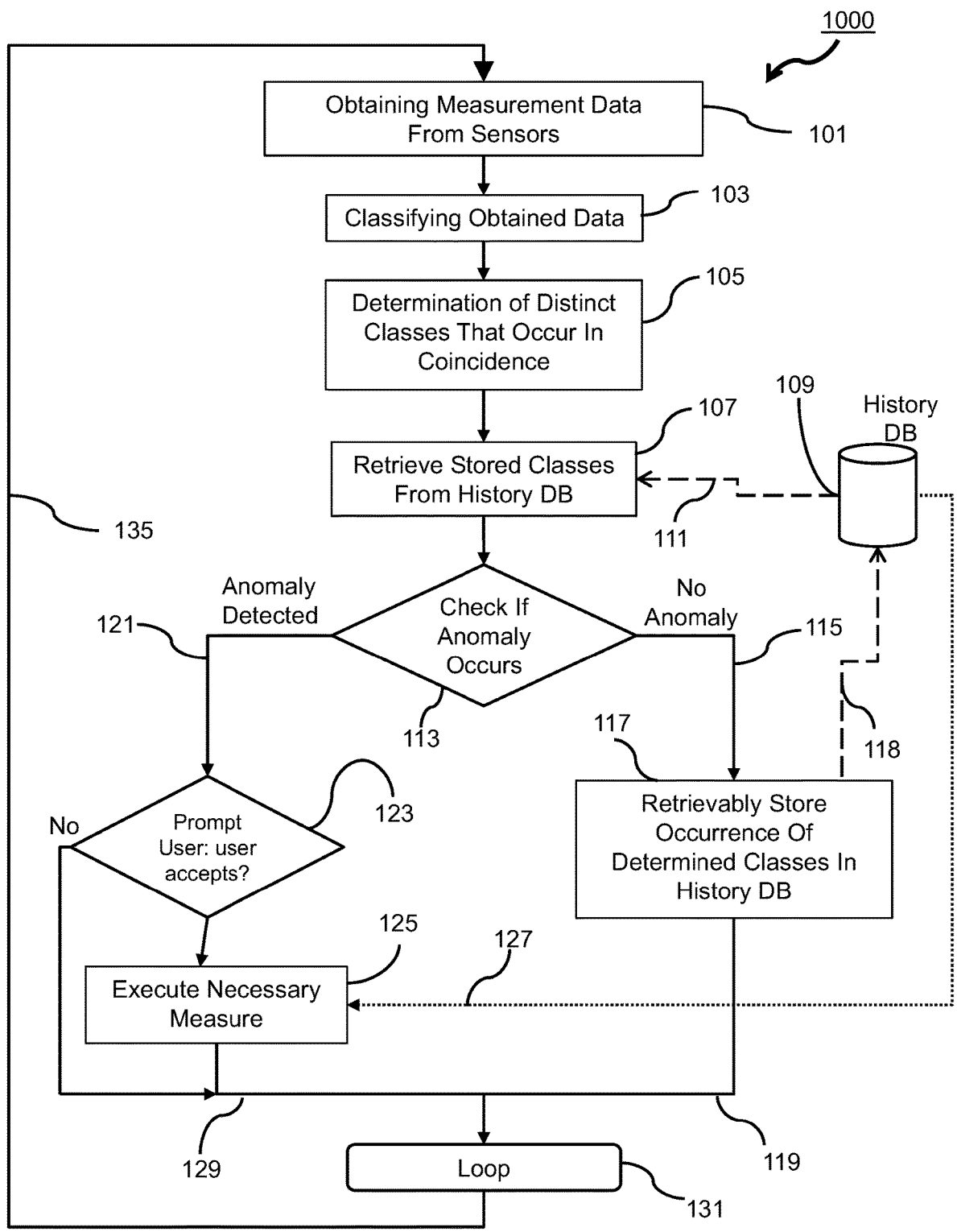
FIG. 3 illustrates a flow chart of a method for a masking of sensitive information, in accordance with an embodiment of the invention.

FIG. 3 illustrates a flow chart of a method 1000 for a masking of sensitive information.

The method 1000 may start with, e.g. continuously, obtaining, 101, measurement data from sensors. For example, all sensor data as received by sensor components 540 alone or in combination with data from radio component module 510, combined with the corresponding parts of software, may be included in this step of obtaining sensor data.

In step 103 the obtained data may be classified. This may have the advantage of grouping data that is similar to each other, so that it might be easier to retrieve it from a database, be it as a key for retrieving data from the database or be it as compressed data to be retrieved from the data base.

In step 105, a determination of distinct classes that occur in coincidence may be performed. Thus, it is possible to establish statistics on profile related data. One example might be, that at certain times the user stays at certain locations. Another example might be, that embodiments of the method may find out the user to be in jogging motion only when the ambient light sensor detects that it is daytime.

In step 107, the method tries to retrieve stored classes, or, recorded profile related data, via a connection 111, from a history database 109, that may already be in a well-maintained state.

In step 113, the method may check as to whether an anomaly has occurred, that is, the method compares the retrieved recorded profile related data to the actual profile related data. In order to compare it, the method may use the replacement score calculation as described above in which the higher is the score, the higher is the deviation between the retrieved recorded profile data and the actual profile related data.

In the case where the difference is relatively low or zero, which might be associated with a low replacement score, a branch 115, "No Anomaly", is taken and processing continues at 117, retrievably storing the actual profile related data or retrievably storing occurrences of determined classes, via line 118, in the history database 109.

In the case where the difference is relatively high, which might be associated with a high replacement score, there may be found an anomaly to be detected, in branch 121, and processing continues at 123, informing and prompting the user about possibly necessary measures to be taken. A measure might be that the user regards the deviation not to contain sensitive information. In that case the user might accept the actual profile related data, and not accept the prompt to execute possibly necessary measures. Another measure might be when the user decides that the actual profile related data is a sensitive information that is to be masked. In this case, the user accepts the prompt to execute possibly necessary measures and masks the actual profile related data in a way already described at different places herein.

If the user accepts that there are sensitive information, the measures are executed at step 125 in order to mask the sensitive information; the mask is computed according to the mathematical language described above; basically at the step 125, the method retrieves the shareable pattern from the history database 109 via line 127, and then will apply the masking following the computation according to the mathematical language described above.

Any of both cases continue, via path 119 or path 129, processing at Loop 131, and processing restarts at 101, via path 135.

Figure 4:
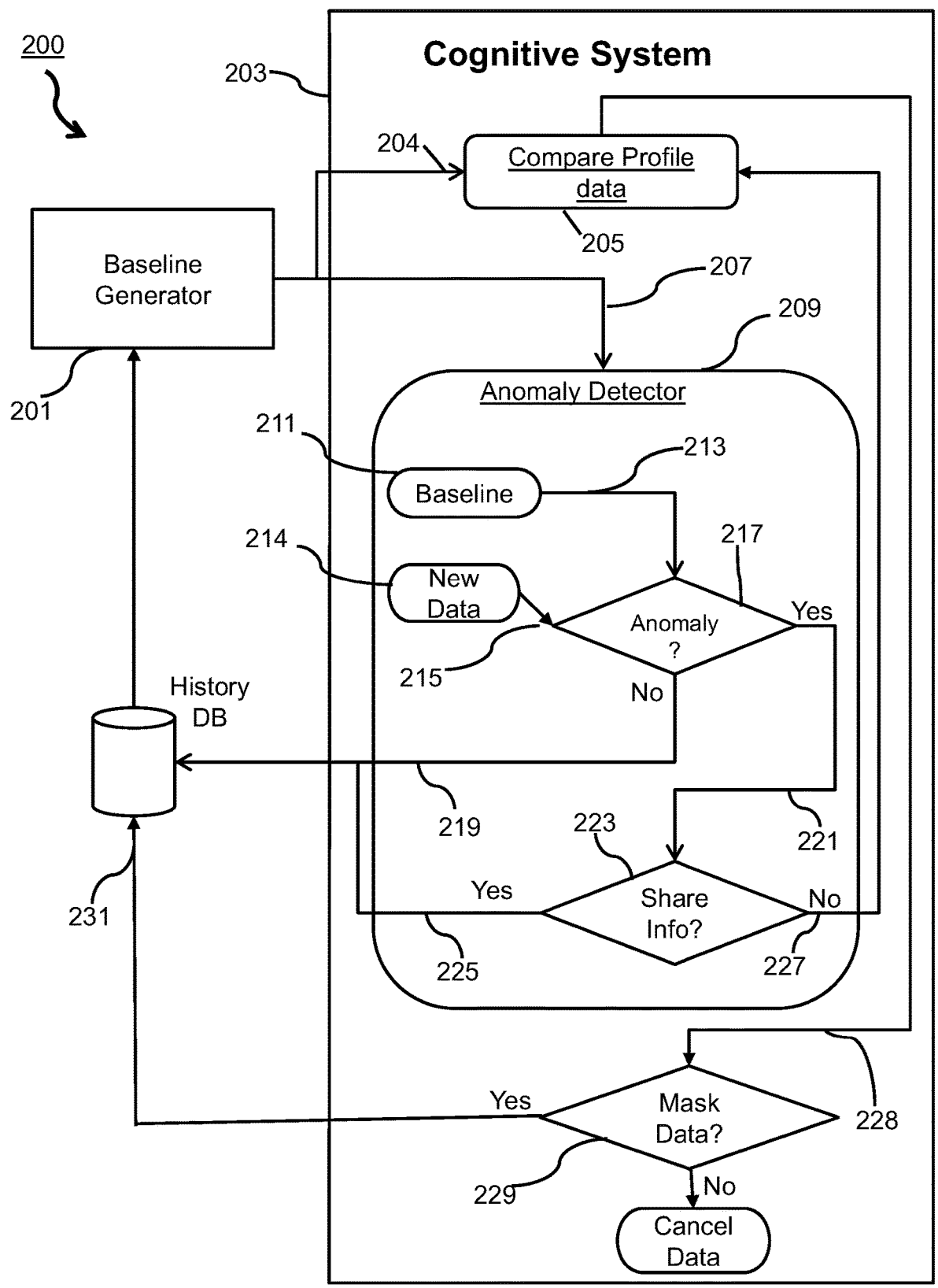
FIG. 4 illustrates another flow chart of a method for a masking of sensitive information, in accordance with an embodiment of the invention.

FIG. 4 illustrates another flow chart of a method 200 for a masking of sensitive information.

A baseline generator 201 may generate a baseline 211. A baseline 211 may be recorded profile related data extracted from the History database 231 that represents normal behavior or represents one or more normal behavior patterns. The baseline generator supplies a cognitive system 203 with the baseline. The cognitive system 203 may be in charge to take care of all information pertinent to a specific behavior and then to propose a possible mask of the activity replacing it with some common pattern. It may be understood that such common pattern may be influenced by specific environment related activities.

The baseline generator 201 supplies, via path 207, an anomaly detector 209 with the baseline 211. The anomaly detector may be a part of software that executes a method as depicted within the rectangle referenced by 209, anomaly detector.

The baseline data 211, e.g. recorded profile related data, may be supplied, via path 213, as well as the new data 214, e.g. actual profile related data, via path 215 to a comparing part of software which tests 217 whether, based on a difference of the new data 214 over the baseline, there is an anomaly in the actual profile related data or not.

In the case where, no anomaly is detected, processing continues via path 219 and the actual profile related data may be written into history database 231. It is considered, that writing the data may be accompanied by performing classification and/or statistics thereon.

In the case where an anomaly is detected, processing continues, via branch 221, to a further decision part of software wherein the user might be asked 223, whether to share the information concerning the actual profile related data or not.

In the case where the user decides to share the actual profile related data, though anomalous, processing continues via path 225, and the actual profile related data may be written into the history database, possibly after some classification and/or statistics as described above.

In the case where the user regards the actual profile related data to be sensitive data, the user may deny sharing the information concerning the actual profile related data. Processing will then be continued via path 227; the actual profile related data is sent to the Compare Profile Data software component 205 via path 227; the Compare Profile Data software component will compare the actual profile related data with the baseline provided via path 204; it will find a valid shareable pattern from the baseline, the closest as possible to the actual profile related data, using the minimum replacement score; the shareable pattern will be sent to the mask data via path 228 and it will be used to mask the actual profile related data with the one recognized by the Compare Profile Data software component or, at least, parts thereof that are regarded to be sensitive data, might be replaced by data that are regarded to be shareable data. The shareable data may be modified according to the environmental cognitive information, as exemplified by the mathematical language above, to become valid shareable data (MP) and proposed in test "Mask Data?" 229 to the user. If the user refuses to mask the actual profile related data with one valid shareable profile related data (answer No to 229), the actual profile related data is deleted, and the history database will not be updated accordingly. If the user chooses to mask the actual profile related data with one valid shareable profile related data (answer Yes to 229), the history database will be updated accordingly.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
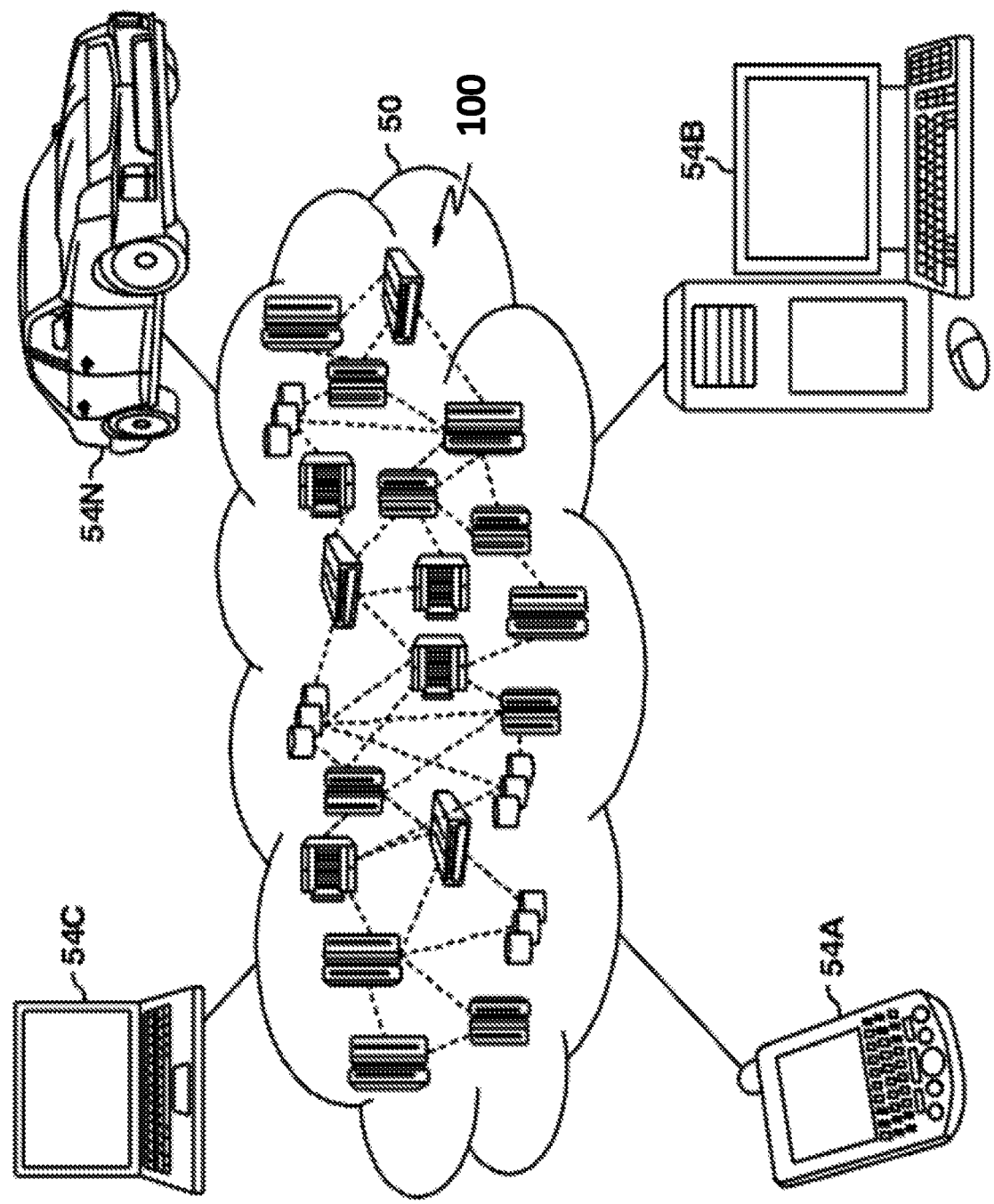
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 6:
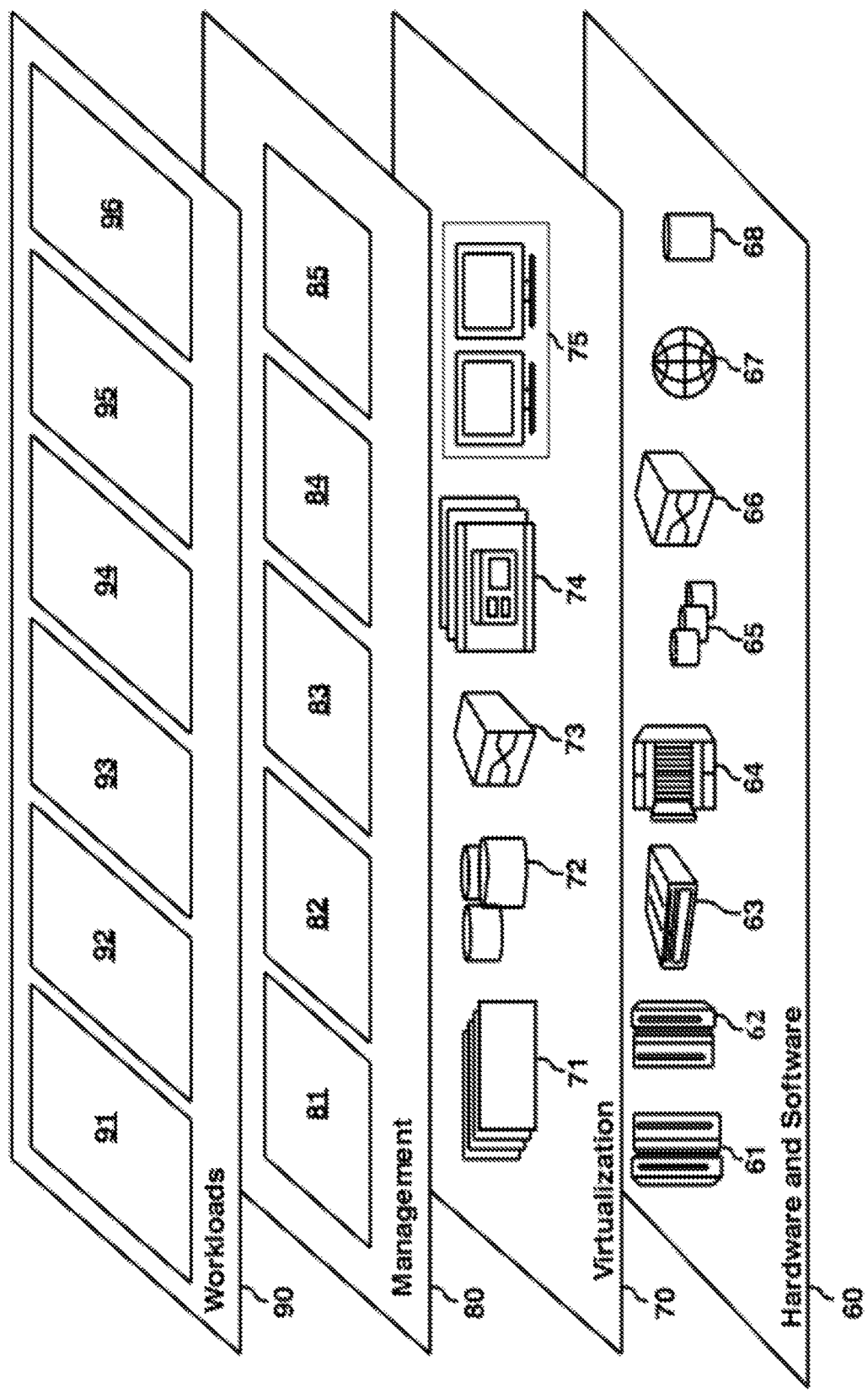
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and profile data masking system 96. Profile data masking system 96 may relate to masking sensitive profile information with alternative profile information.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer implemented method to replace profile related data, the method comprising:
   providing a history database, wherein the history database comprises recorded profile related data;
   receiving actual profile related data;
   retrieving, by a processor, from the history database, at least one recorded profile related data, wherein the at least one recorded profile related data matches to the actual profile related data;
   prompting, by a processor, a user with alternative profile data, wherein the alternative profile related data comprises the at least one recorded profile related data, and wherein the at least one recorded profile related data is modified according to available environmental conditions;
   receiving, from the user, a command to replace at least one part of the actual profile related data with the alternative profile related data; and
   replacing the at least one part of the actual profile related data with the alternative profile related data.

2. The computer implemented method of claim 1, wherein the recorded profile related data represents physical data received from at least one first sensor and the actual profile related data represents physical data received from at least one second sensor.

3. The computer implemented method of claim 1, further comprising:
   comparing, by the processor, whether the retrieved at least one recorded profile related data differs from the actual profile related data;
   in the case that the comparing yields a difference, prompting, by the processor, the difference to the user.

4. The computer implemented method of claim 3, wherein the profile related data comprises a dependent part, and wherein, in the step of comparing, a dependent part of the at least one recorded profile related data is compared to a dependent part of the actual profile related data.

5. The computer implemented method of claim 3, further comprising:
  determining the actual profile related data to be an anomaly when the comparing yields a difference between the retrieved at least one recorded profile related data and the actual profile related data.

6. The computer implemented method of claim 1, wherein the replacing comprises suggesting, to the user, to replace the at least one part of the actual profile related data with either the alternative profile related data or another retrieved recorded profile related data.

7. The computer implemented method of claim 1, wherein the profile related data comprises an independent part.

8. The computer implemented method of claim 7, wherein, in the step of retrieving, the at least one recorded profile related data is found to be matching to the actual profile related data when an independent part of the at least one recorded profile related data is identical to or matches to an independent part of the actual profile related data.

9. The computer implemented method of claim 1, wherein providing the history database comprises evaluating the profile related data to establish a baseline.

10. The computer implemented method of claim 1, wherein receiving the actual profile related data comprises receiving physical data that comprises one or more of the following: time, location, temperature, relative humidity, radio frequency interactions, ambient light brightness, orientation, velocity, acceleration, magnetic field, pressure, proximity, operating a button, data of a mobile camera.

11. The computer implemented method of claim 1, executed, by at least one processor in batch mode or in online mode or in a combination of the batch mode and the online mode.

12. The computer implemented method of claim 1, further comprising:
  deleting the actual profile related data, in response to receiving the command to replace at least one part of the actual profile related data with the alternative profile related data.

13. The computer implemented method of claim 1, further comprising:
  computing, by the processor, a replacement score, based on an element from the group consisting of: environmental information retrieved from at least one sensor; profile data replacement history; and a time when the actual profile related data has been followed.

14. A computer program product to replace profile related data, the computer program product comprising:
  a computer readable storage medium having computer usable code embodied therewith, wherein the computer readable storage medium is not a transitory signal per se, the computer usable program code comprising:
    computer usable code configured to provide a history database, wherein the history database comprises recorded profile related data;
    computer usable code configured to receive actual profile related data;
    computer usable code configured to retrieve, by a processor, from the history database, at least one recorded profile related data, wherein the at least one recorded profile related data matches to the actual profile related data;
    computer usable code configured to prompt, by a processor, a user with alternative profile data, wherein the alternative profile related data comprises the at least one recorded profile related data, and wherein the at least one recorded profile related data is modified according to available environmental conditions;
    computer usable code configured to receive, from the user, a command to replace at least one part of the actual profile related data with the alternative profile related data; and
    computer usable code configured to replace the at least one part of the actual profile related data with the alternative profile related data.

15. The computer program product of claim 14, wherein the recorded profile related data represents physical data received from at least one first sensor and the actual profile related data represents physical data received from at least one second sensor.

16. The computer program product of claim 14, further comprising:
  comparing, by the processor, whether the retrieved at least one recorded profile related data differs from the actual profile related data;
  in the case that the comparing yields a difference, prompting, by the processor, the difference to the user.

17. The computer program product of claim 14, further comprising:
  deleting the actual profile related data, in response to receiving the command to replace at least one part of the actual profile related data with the alternative profile related data.

18. A mobile computer carrying a computer program product to replace profile related data, the computer program product comprising:
  a computer readable storage medium having computer usable code embodied therewith, wherein the computer readable storage medium is not a transitory signal per se, the computer usable program code comprising:
    computer usable code configured to provide a history database, wherein the history database comprises recorded profile related data;
    computer usable code configured to receive actual profile related data;
    computer usable code configured to retrieve, by a processor, from the history database, at least one recorded profile related data, wherein the at least one recorded profile related data matches to the actual profile related data;
    computer usable code configured to prompt, by a processor, a user with alternative profile data, wherein the alternative profile related data comprises the at least one recorded profile related data, and wherein the at least one recorded profile related data is modified according to available environmental conditions;
    computer usable code configured to receive, from the user, a command to replace at least one part of the actual profile related data with the alternative profile related data; and
    computer usable code configured to replace the at least one part of the actual profile related data with the alternative profile related data.

19. The mobile computer of claim 18, further comprising:
  comparing, by the processor, whether the retrieved at least one recorded profile related data differs from the actual profile related data;
  in the case that the comparing yields a difference, prompting, by the processor, the difference to the user.

20. The mobile computer of claim 18, further comprising:
deleting the actual profile related data, in response to receiving the command to replace at least one part of the actual profile related data with the alternative profile related data.

\* \* \* \* \*